United States Patent
Hodroj et al.

(10) Patent No.: US 9,979,667 B2
(45) Date of Patent: May 22, 2018

(54) HOME-BASED ROUTER WITH TRAFFIC PRIORITIZATION

(71) Applicant: T-Mobile USA, Inc., Bellevue, WA (US)

(72) Inventors: Samir Hodroj, Bothell, WA (US); Boris Antzev, Bothell, WA (US); Hichem Zait, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 74 days.

(21) Appl. No.: 14/872,029

(22) Filed: Sep. 30, 2015

(65) Prior Publication Data

US 2016/0095132 A1    Mar. 31, 2016

Related U.S. Application Data

(60) Provisional application No. 62/057,976, filed on Sep. 30, 2014.

(51) Int. Cl.
| | |
|---|---|
| *H04W 72/10* | (2009.01) |
| *H04W 28/02* | (2009.01) |
| *H04W 28/08* | (2009.01) |
| *H04W 72/04* | (2009.01) |
| *H04L 12/873* | (2013.01) |
| *H04L 12/851* | (2013.01) |
| *H04L 12/863* | (2013.01) |

(52) U.S. Cl.
CPC ........ *H04L 47/522* (2013.01); *H04L 47/2433* (2013.01); *H04W 28/08* (2013.01); *H04L 47/6215* (2013.01)

(58) Field of Classification Search
None
See application file for complete search history.

(56) References Cited

U.S. PATENT DOCUMENTS

| | | | |
|---|---|---|---|
| 5,786,773 A | 7/1998 | Murphy | |
| 6,546,492 B1 | 4/2003 | Walker et al. | |
| 7,957,394 B1 * | 6/2011 | Cohen ................. | H04L 41/0806 370/230.1 |
| 8,018,850 B2 * | 9/2011 | van Beek ........... | H04N 21/2365 370/232 |

(Continued)

OTHER PUBLICATIONS

Abrahamsson, Security Enhanced Firmware Update Procedures in Embedded Systems, 2008.

(Continued)

*Primary Examiner* — Vinncelas Louis
(74) *Attorney, Agent, or Firm* — Han Santos, PLLC (57) ABSTRACT

Systems and methods provide for traffic prioritization in a Wi-Fi router which may have separate private and public networks. A software prioritization engine component may inspect incoming data packets, may assign a priority value to each packet according to prioritization rules, and may distribute each packet into an output queue accordingly. A probing functionality may measure router uplink. A rate limiter may dynamically allocate bandwidth to output queues according to bandwidth allocation rules. The prioritization rules and bandwidth allocation rules may favor emergency data, voice call data, private Wi-Fi network data, and data relating to a particular cellular network.

20 Claims, 6 Drawing Sheets

(56) References Cited

U.S. PATENT DOCUMENTS

| | | |
|---|---|---|
| 8,184,550 B2* | 5/2012 | Beck ................ H04L 12/66 370/252 |
| 2003/0072304 A1* | 4/2003 | Gummalla ............ H04J 3/1694 370/389 |
| 2005/0021968 A1 | 1/2005 | Zimmer et al. |
| 2005/0174935 A1 | 8/2005 | Segel |
| 2006/0005046 A1 | 1/2006 | Hars |
| 2006/0143600 A1 | 6/2006 | Cottrell et al. |
| 2009/0228697 A1 | 9/2009 | Kurashige |

OTHER PUBLICATIONS

Jones, Exploiting Embedded Devices, SANS Institute, 2012.
Ramsdell, Request for Comments 2633—S/MIME Version 3 Message Specification, 1999.
Shade, Implementing Secure Remote Firmware Updates, 2011.
Non-Final Office Action for U.S. Appl. No. 14/979,336, dated May 23, 2017, 39 pages.
"Non-Final Office Action" for U.S. Appl. No. 14/979,363, dated Oct. 6, 2017, 17 pages.

\* cited by examiner

HOME-BASED ROUTER WITH TRAFFIC PRIORITIZATION

CROSS REFERENCE TO RELATED PATENT APPLICATION

This patent application claims priority from U.S. Provisional Application No. 62/057,976, filed Sep. 30, 2014, which application is hereby incorporated in its entirety by reference.

BACKGROUND

In recent years, home Wi-Fi networks have become very popular. Wi-Fi networks are typically deployed with a wireless router device which may be pre-configured. A user's home wireless router device is often included during the installation of internet access by the user's internet service provider (ISP).

Similarly to Wi-Fi routers, smart phone mobile devices provisioned with Wi-Fi connectivity have become ubiquitous in recent years. A user of a smart phone typically subscribes to a cellular network carrier in order to use the smart phone to make voice calls over the carrier's circuit-switched network and to access the internet over the carrier's packet-switched network via a licensed communications channel such as Long-Term Evolution (LTE) broadband.

Since it is common for a user to own both a Wi-Fi router and a smart phone, users often have more than one way for their smart phone to access the internet. However, since carriers typically charge a higher premium than ISPs for such data, a user may often wish to connect their smart phone to the Wi-Fi router via the smart phone's Wi-Fi radio rather than using the carrier's packet-switched network.

Additionally, rather than utilizing a carrier's network to make a voice call, a user may want to utilize a Wi-Fi network to make a voice call via their ISP. While many voice over internet protocol (VoIP) solutions have allowed for this type of call, conventional solutions have not allowed calls to be made to and from wireless subscriber phone numbers. For this reason, some smart phones have become provisioned with the ability to initiate and receive voice calls from wireless subscriber phone numbers via their Wi-Fi router.

However, conventional Wi-Fi routers may not be configured to allow a consistent acceptable quality of service (QoS) for users engaging in a Wi-Fi call. For example, a user may be likely to experience a dropped voice call when attempting to engage in a Wi-Fi call via a Wi-Fi router that is concurrently being used by other networked devices for activities with typically high data use such as streaming video and browsing the internet. Users may be less forgiving of a drop in quality of service of a voice call than that of another service such as video streaming. Conversely, a particular user may wish rather to give precedence to another service, such as the quality of their streaming video.

Further, a user may wish to allow a guest access to a home Wi-Fi router without allowing the guest to access the local resources connected to the router. However, conventional routers may not have a way to ensure that the quality of the services in use by non-guests is not greatly impeded by heavy usage by the guest. Similarly, a Wi-Fi router with several connected devices corresponding to several types of transferred data may not have a way to ensure that a particular type of transferred data is not blocked by the transfer of other types of data.

BRIEF DESCRIPTION OF THE DRAWINGS

The Detailed Description is set forth with reference to the accompanying figures.

DETAILED DESCRIPTION

Context of Traffic Prioritization for a Home-Based Router Overview

This disclosure is related to techniques for providing a router traffic prioritization engine for a home-based router. The router traffic prioritization engine software may allow a particular type of router traffic to be prioritized over another. Upon receiving a data packet from a communications channel, the router traffic prioritization engine may inspect the data packet according to prioritization rules, assign a priority value to the data packet, and distribute the data packet to an output queue according to its assigned priority. A prioritization rule may come preconfigured as default settings on a router, may be customized by a user via an application, and may relate to the criteria for assigning a given priority value to an inspected data packet.

In some embodiments, communications interfaces present in the router may comprise: an unlicensed communications interface, which may be an interface allowing communications at a short range without being required to operate under terms set forth by government and/or companies, such as Wi-Fi or Bluetooth; a third-party communications interface, which may be an interface allowing communications with an ISP, such as cable broadband or satellite broadband; and a regulated communications interface, which may be an interface allowing communications with carrier of wireless communications, such as LTE broadband or LTE-Advanced.

Wi-Fi generally refers to wireless networks compliant with the IEEE 802.11 series and any successor series of wireless standards. A Wi-Fi communications interface may provide for a plurality of Wi-Fi networks, one of which may be a private Wi-Fi network, which may allow for encryption of router traffic relating to this channel, and one of which may be a guest Wi-Fi network, which may allow router usage to a guest user and which may not allow the guest user to have access to the router's local resources.

In some embodiments, an output queue may be filled with data packets as received. When the router output bandwidth has been exceeded, packets may be placed into an overflow queue by a distributor. The distributor may place packets into the overflow queue according to priority. Specifically, a look-ahead function may be utilized to place a data packet behind the last packet in the overflow queue having an assigned priority value greater than or equal to that of the data packet to be placed into the overflow queue.

Various embodiments may include a plurality of output queues, each of which may correspond to a priority value, and each of which has a transfer rate limit governed by the router traffic prioritization engine. Accordingly, the router traffic prioritization engine may provide a probing functionality for measuring the uplink of the ISP. The probing functionality may not result in additional data traffic present in the router due to the probing functionality. The rate limiter may dynamically adjust the allocated bandwidth of an output queue. The adjusting of allocated bandwidth may depend on bandwidth allocation rules present in the router traffic prioritization engine, the number of active sessions corresponding to a given priority, and the ISP uplink speed measured via the probing functionality. As a result, traffic in a particular queue may not be completely blocked.

The bandwidth of a home-based router may depend on the uplink and downlink connection to the internet provided by the router owner's Internet Service Provider, which may be connected to the router via a cable modem. Additionally, the LTE broadband connection may be connected to the router, such as via a USB or other serial interface, and provisioned with connection to a wireless communications carrier's core network. The LTE broadband channel may be leveraged to balance traffic load with the cable broadband channel, transfer secure data via a non-public network, or to provide a fallback service in case of the failure of another broadband channel.

The techniques may provide a way to sustain a desirable quality of service for services communicated through the router. For example, the router traffic prioritization engine may be configured to prioritize voice data over non-voice data, to prioritize data relating to the router's private network over data relating to the router's guest network, to prioritize data packet with a particular wireless communications carrier as its source or destination over other data packets, and/or to prioritize emergency voice data over all other data. The techniques described herein may be implemented in a number of ways. Example implementations are provided below with reference to the following figures.

Figure 1:
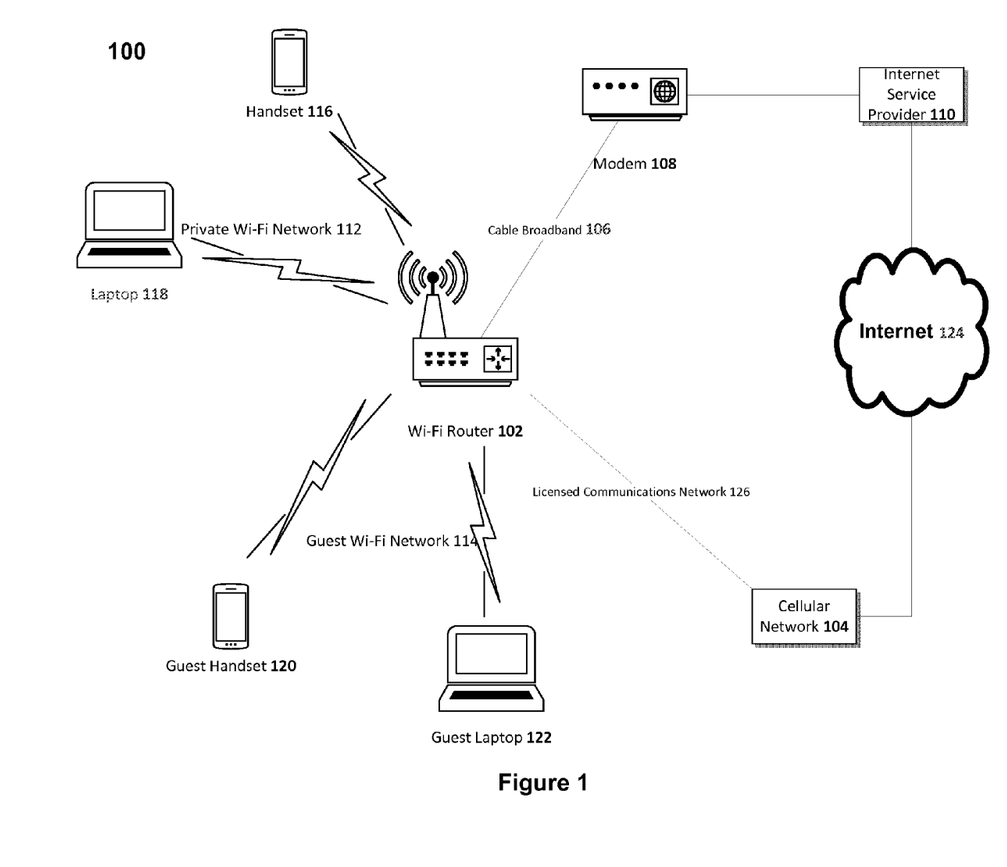
FIG. 1 is a context diagram for a Home-based Router with Traffic Prioritization.

FIG. 1 is a context diagram 100 for implementing a router traffic prioritization engine on a home based Wi-Fi router, or router 102. Ordinarily, a voice call may be connected through a cellular network 104 which may be provided by a wireless communications carrier. Furthermore, a wireless communication carrier may allow a voice call to be connected via the internet 124.

Accordingly, users may like to intervene with a router 102. The router 102 may be connected via cable broadband 106 to a cable modem 108. The cable modem 108 be connected to an Internet Service Provider, or ISP 110, which is connected to the internet 124.

The router may have one or more mobile devices connected via a Wi-Fi network to the router 102. The Wi-Fi network may be a private Wi-Fi network 112 or a guest Wi-Fi network 114. The private Wi-Fi network 112 may be a router network that may allow encryption and may require a user to enter a password upon a device in order for the device to have access to the private Wi-Fi network. A guest Wi-Fi network 114 may be a router network that allows guest access to the router but does not allow access to the local resources of the router.

Accordingly, a handset 116 may be connected to a private Wi-Fi network 112. The handset 116 may be a mobile device which has access to the private Wi-Fi network 112 and may additionally have access to a cellular network 104. A router 102 may have other devices connected to the private Wi-Fi network. For example, a laptop 118 may be a personal computer which has access to the private Wi-Fi network 112.

Additionally, a guest handset 120 may be connected to a guest Wi-Fi network 114. The guest handset 120 may be a mobile device which has access to the guest Wi-Fi network 114 and may additionally have access to a cellular network 104. A guest laptop 122 may be a personal computer which has access to the guest Wi-Fi network 114.

A router 102 may have other devices connected to the guest Wi-Fi network. Additionally, any of the devices may be connected to a cellular network owned by a wireless communication carrier other than the wireless communication carrier of cellular network 104.

A user may prefer the QoS of a particular type of data traffic to be prioritized over another. Accordingly, the router 102 may be configured to prioritize data traffic flowing through the private Wi-Fi network 112 over data traffic flowing through the guest Wi-Fi network 114. Additionally: the router may be configured to prioritize voice call data traffic over other data traffic; and the router may be configured to prioritize data traffic with a particular source or destination over other data traffic.

Additionally, the router 102 may be connected via LTE broadband 126 to a cellular network 104. The cable modem 108 be connected to an ISP 110 which is connected to the internet 124.

Figure 2:
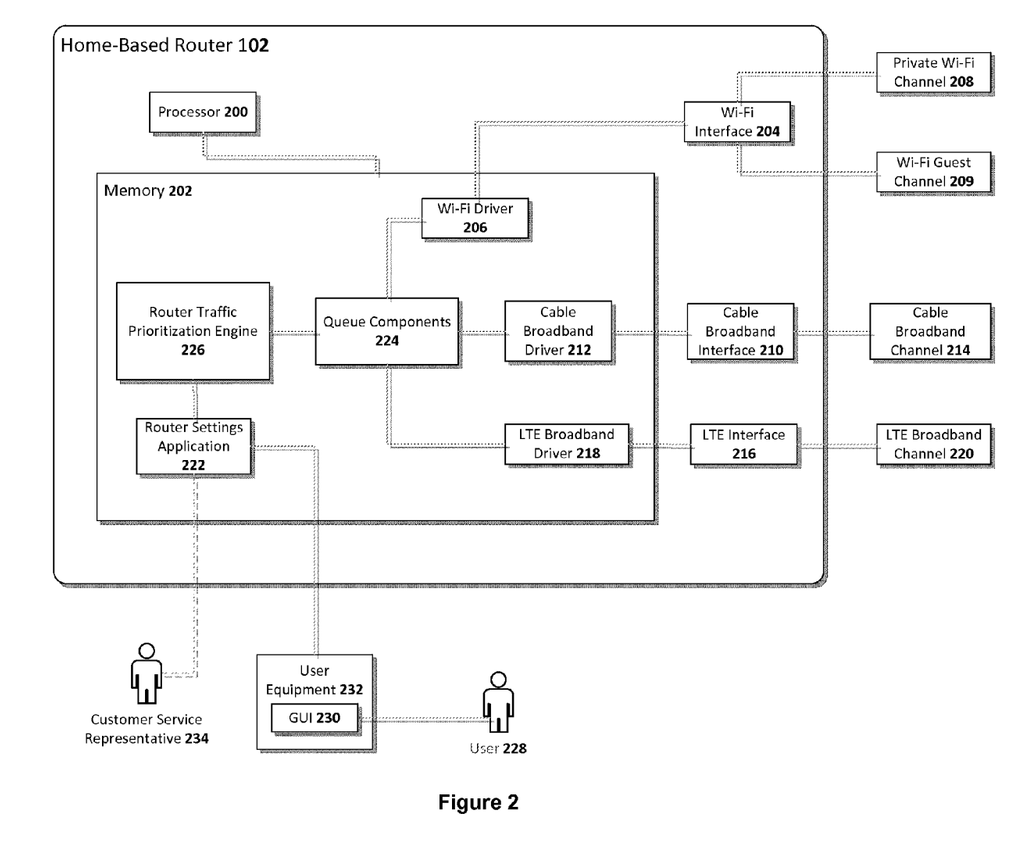
FIG. 2 is a flow chart of an exemplary hardware, software and communications environment for a Home-based Router with Traffic Prioritization.

FIG. 2 illustrates the hardware, software, and communications components of the router 102. A router 102 may have a processor 200 and a memory 202. Memory 202 of router 102 is any computer-readable media which may store several software components including an application and/or an operating system. In general, a software component is a set of computer executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Wi-Fi interface 204 may be a radio communicatively coupled to a Wi-Fi driver 206 resident in a memory 202. The Wi-Fi interface 204 may allow a plurality of radios. The Wi-Fi interface 204 may be allow a plurality of networks which may comprise Wi-Fi Private Channel 208 and Wi-Fi Guest Channel 209.

A cable broadband interface 210 may be communicatively coupled to the cable broadband driver 212 resident in the memory 202. The cable broadband interface 210 may connect via a cable to the cable modem 108 which may provide a cable broadband channel 214 via an ISP 110.

An LTE broadband interface 216 may be an interface communicatively coupled to the LTE broadband driver 218 resident in the memory 202. The LTE broadband interface 216 may connect wirelessly via an LTE broadband channel 220 to a cellular network 104. The LTE broadband channel 220 may be used simultaneously with the cable broadband channel 214. For example, the router 102 may have an algorithm which may perform data traffic load balancing functionality. Additionally, an algorithm within the router 102 may allow fallback support in the event that either channel experiences a drop in QoS.

Furthermore, the router 102 may allow separate data transfer for secure data through the LTE broadband channel 220. Similarly, a user may customize the router 102 to split traffic between the two channels via the router settings application 222. In various embodiments, the LTE broadband interface may be connected to the router, such as via a USB or other serial interface, and provisioned with connection to a wireless communications carrier's core network.

The Wi-Fi driver 206, the cable broadband driver 212, and the LTE broadband driver 218 may be communicatively coupled to the queue components 224, which may be resident in the memory. Accordingly, a data packet transferred via a Wi-Fi interface 204, a cable broadband interface 210, and/or an LTE broadband interface 216 may be received and transferred by the queue components 224.

The router traffic prioritization engine 226 may be a software component resident in the memory 202 which may be configured to have rules, may inspect data packets, may assign priority values to data packets, and may distribute data packets to the queue components according to the rules. Various embodiments of a router traffic prioritization engine 226 may include provide for dynamic bandwidth allocation functionality of the queue components 224. Dynamic bandwidth allocation functionality may limit rates for multiple queues each corresponding to a particular priority value according to at least one rule.

Router settings application 222 resident in the software may provide a user 228 to change prioritization rules within the router traffic prioritization engine via a graphical user interface 230 which may be viewed and executed on a user equipment 232. The user equipment 232, which may be connected via a Wi-Fi network, may be a laptop, smart phone, or other device. The user 228 may be the router owner and/or router administrator, and may customize at least one rule which may affect the router traffic prioritization engine 226 and/or bandwidth allocation of the queue components 224.

In some cases, a particular rule or set of rules may be preferred by an owner or administrator of a router 102, a user 228 may require assistance from a customer service representative 234. Accordingly, the router settings application 222 may also be controlled by customer service representative 234 via a session which may be resident in the cellular network 104. Additionally the prioritization rules within the router traffic prioritization engine 226 may include at least one rule related to QoS of a service related to a particular type of data traffic.

The private Wi-Fi channel may be a private network broadcast by a Wi-Fi Interface 204. The private network may have a service set identifier (SSID) that may be used by a user to access the private network. The private network may require a user to enter a password to connect to the private network.

The guest Wi-Fi channel may be a guest network which may be broadcast by a Wi-Fi Interface 204. The guest network may have a service set identifier (SSID) that may be used by a user to access the guest network. The guest network may be configured to allow a limited number of users connected simultaneously. A user connected to the guest network may not be granted administrative privileges over router functions. However, a user connected to the guest network may not be allowed to utilize the router 102's local resources.

In various embodiments, the Wi-Fi Interface 204 may be a dual band radio. The router 102 may be configured for rate adaptation functionality which may be applied via an algorithm executed in the memory 202. Further, the router may be configured to apply a separate rate adaptation functionality algorithm for particular types of data traffic. In particular, the rate adaptation functionality algorithm may more quickly favor slow transmission speeds when a station involved in a voice session comes closer to the edge of the coverage range of the router 102's radio.

Use Case—Single Output Queue with Look-Ahead

Figure 3:
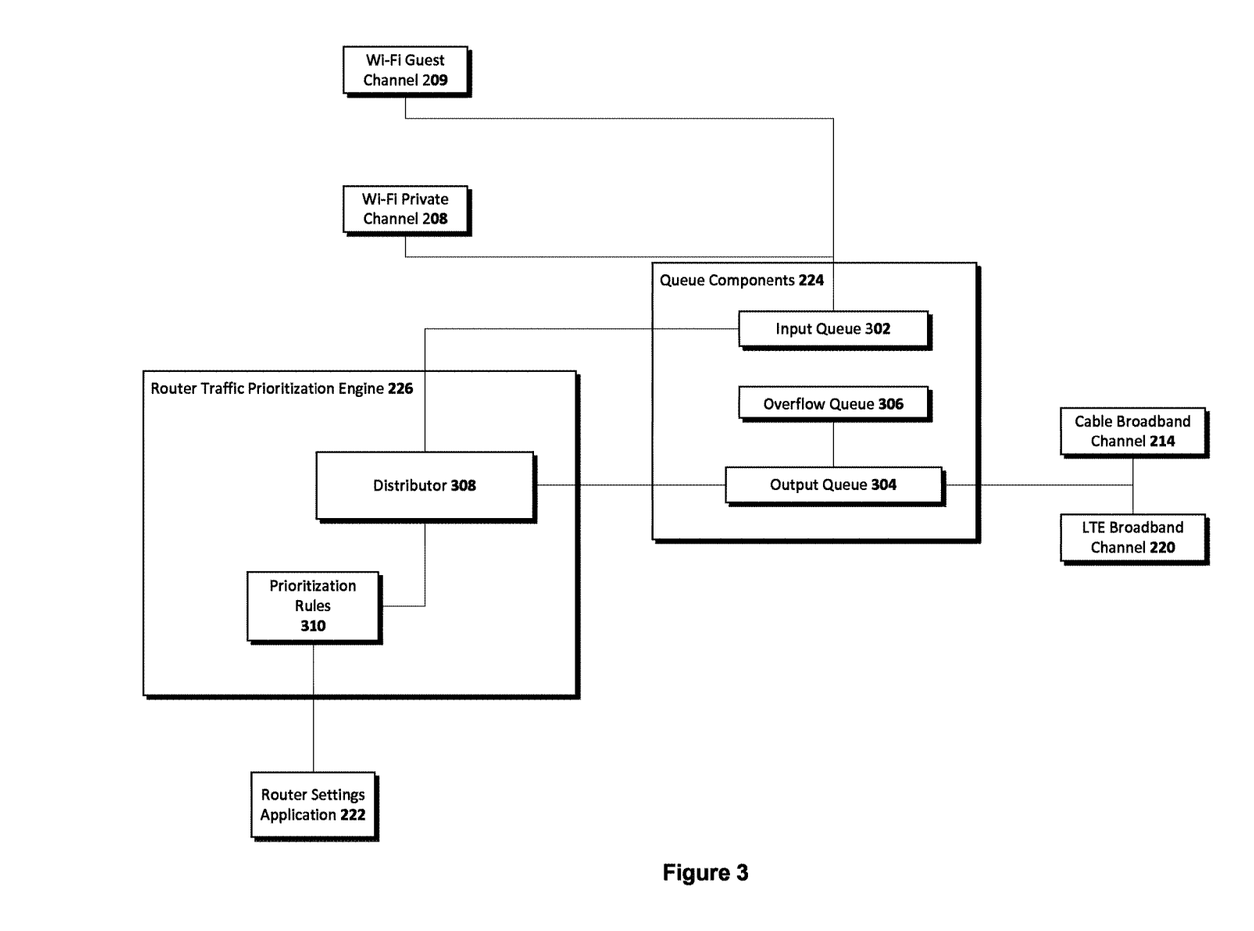
FIG. 3 is a block diagram for Home-based Router with Traffic Prioritization using a single output queue.

FIG. 3 is a block diagram for Home-based Router with Traffic Prioritization using a single output queue.

In various embodiments, the queue components 224 may comprise an input queue 302, an output queue 304, and an overflow queue 306. An input queue 302 may receive data packets from a communications interface within the router 102. The output queue 304 may transfer data packets according to the router traffic prioritization engine 226. The overflow queue 306 may be a buffer for data packets to queue if a bandwidth of the router 102 has been exceeded.

In various embodiments, the router traffic prioritization engine 226 may comprise a distributor 308 and prioritization rules 310. The distributor may be a software component with functionality to inspect a data packet, assign a priority value to the packet, and distribute the packet to an output queue or to an overflow queue, according to prioritization rules 310. The prioritization rules 310 may include a definition of the criteria for each of a plurality of priority values that may be assigned to a data packet. The criteria for each priority value may relate to any of the following characteristics of an inspected packet: data type, source, destination, and SSID.

Figure 4:
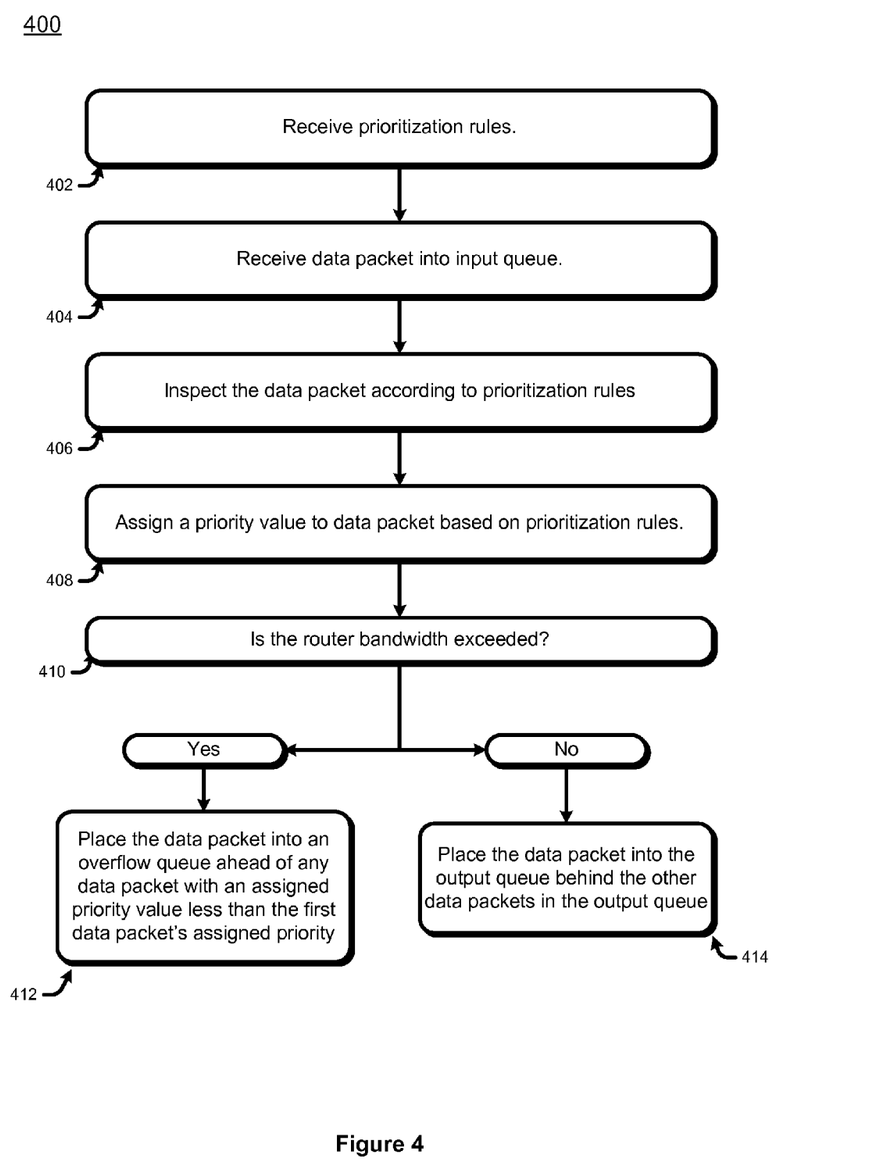
FIG. 4 is a flow chart for a Home-based Router with Traffic Prioritization using a single output queue.

FIG. 4 is a flow chart 400 for a Home-based Router with Traffic Prioritization using a single output queue.

At block 402, a router 102 may receive prioritization rules 310.

At block 404, an input queue may receive a data packet.

At block 406, the distributor 308 may inspect the data packet according to the prioritization rules.

At block 408, the distributor 308 may assign a priority value to the data packet based on the prioritization rules 310.

At block 410, the router traffic prioritization engine 226 may determine whether transferring the packet into the output queue 304 will cause the router bandwidth to be exceeded. The router traffic prioritization engine 226 may have a mechanism for measuring the bandwidth of the router 102. Alternatively, the router traffic prioritization engine 226 may have a mechanism for measuring bandwidth.

If it is determined that transferring the packet into the output queue components 504 will cause the router bandwidth to be exceeded, as depicted by block 412, the distributor may place the data packet into an overflow queue ahead of any other data packet in the overflow queue with an assigned priority less than the first data packet's assigned priority score.

If it is determined that transferring the packet into the output queue 304 will not cause the router bandwidth to be exceeded, as depicted by block 414, the distributor may place the data packet into the output queue behind the other data packets in the output queue.

Additionally, the described techniques may allow prioritization of a particular type of data traffic over another.

In various embodiments, voice data traffic may be configured to be prioritized over non-voice data traffic. For example, the prioritization rules 310 may be configured to assign a higher priority value to a data packet determined via inspection within the distributor 308 to have a voice data type than to another type of data packet.

In various embodiments, data traffic with a particular cellular network as its source or destination may be configured to be prioritized over other traffic. For example, the prioritization rules 310 may be configured to assign a higher priority value to a data packet determined via inspection within the distributor 308 to have a source or a destination corresponding to a particular cellular network than to another type of data packet.

In various embodiments, emergency voice data traffic may be configured to be prioritized over all other traffic. For example, the prioritization rules 310 may be configured to assign a higher priority value to a data packet determined via inspection within the distributor 308 to relate to an emergency voice call than to another type of data packet.

In various embodiments, and data traffic related to a device connected to the router 102 via a private Wi-Fi network may be configured to be prioritized over data traffic related to a device connected to the router 102 via a guest Wi-Fi network. For example, the prioritization rules 310 may be configured to assign a higher priority value to data packets detected to relate to a private Wi-Fi network SSID than to data packets detected to relate to a guest Wi-Fi network SSID.

Use Case—Multiple Output Queues with Dynamic Bandwidth Allocation

Figure 5:
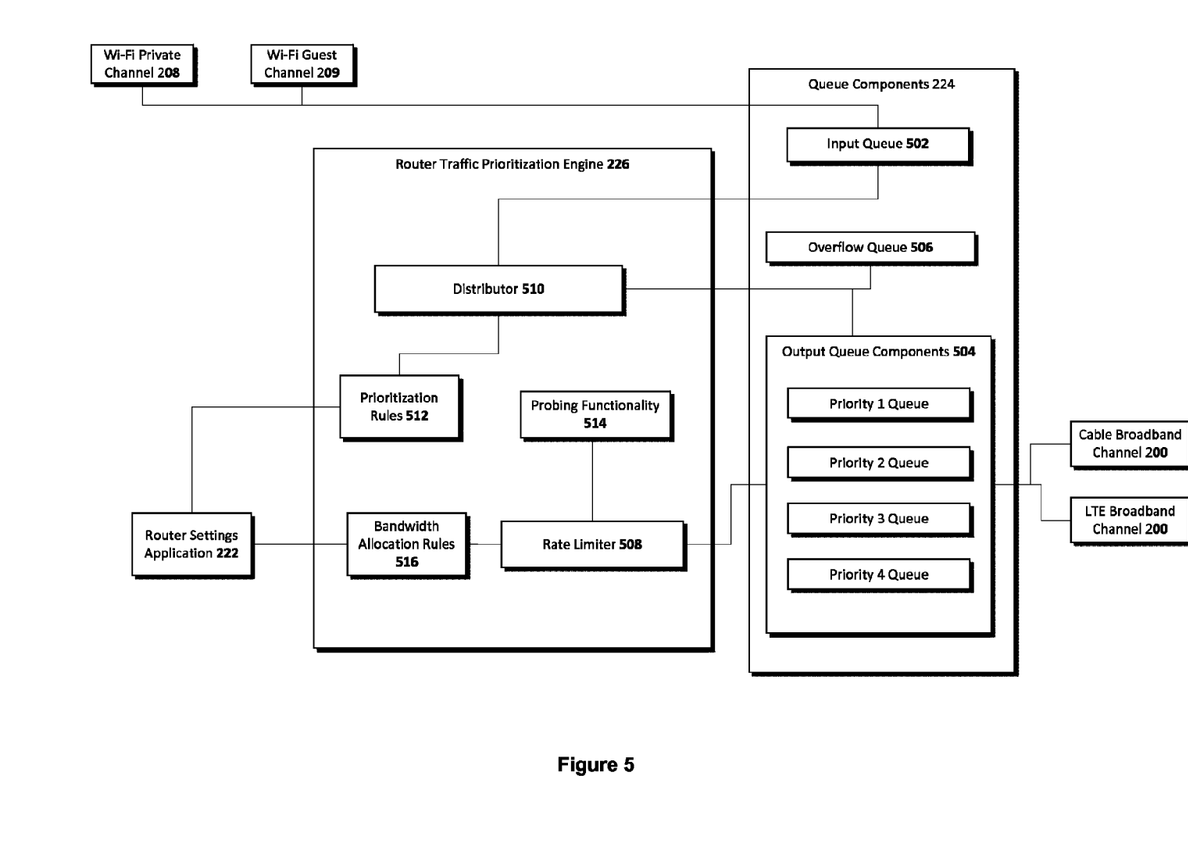
FIG. 5 is a block diagram for Home-based Router with Traffic Prioritization using multiple output queues with dynamic bandwidth allocation.

FIG. 5 is a block diagram for Home-based Router with Traffic Prioritization using multiple output queues with dynamic bandwidth allocation.

In various embodiments, the queue components 224 may comprise an input queue 502, output queue components 504, and an overflow queue 506. An input queue 502 may receive data packets from a communications interface within the router 102. The output queue components 504 may transfer data packets according to the router traffic prioritization engine 226. The output queue components may comprise a plurality of output queues, and each output queue may be provisioned by the router traffic prioritization engine 226 to have relate to a priority value. All output queues within the output queue components 504 may transfer data packets simultaneously; however, each output queue may be assigned a unique bandwidth allocation by the rate limiter 508. A bandwidth allocation may be maximum allowed transfer rate determined by the bandwidth allocation rules and the router traffic prioritization engine 226, and may be governed by the rate limiter 508. The overflow queue 506 may be a buffer for data packets to queue if a bandwidth of the router 102 has been exceeded.

In various embodiments, the router traffic prioritization engine 226 may comprise a distributor 510, prioritization rules 512, a probing functionality 514, a rate limiter 508, and bandwidth allocation rules 516. The distributor may be a software component with functionality to inspect a data packet, assign a priority value to the packet, and distribute the packet to an output queue or to an overflow queue, according to prioritization rules 512. The prioritization rules 512 may include a definition of the criteria for each of a plurality of priority values that may be assigned to a data packet. The criteria for each priority value may relate to any of the following characteristics of an inspected packet: data type, source, destination, and SSID.

The probing functionality 514 may a software component that measures the uplink speed of the router. The probing functionality 514 may be configured to probe the router uplink speed at set intervals, may be configured to measure average uplink rates, and may be configured to store historical data within storage within the memory 202. The rate limiter 508 may be a software component that adjusts a transfer rate limit for at least one of the output queue components 504. The probing functionality 514 and the rate limiter 508 may impose little computational overhead and consume only a limited amount of memory resources.

The bandwidth allocation rules 516 may include a specification of a default minimum transfer rate for each of the output queue components 504 and may include at least one definition of criteria for adjusting transfer rate limits of at least one of the output queue components 504.

Figure 6:
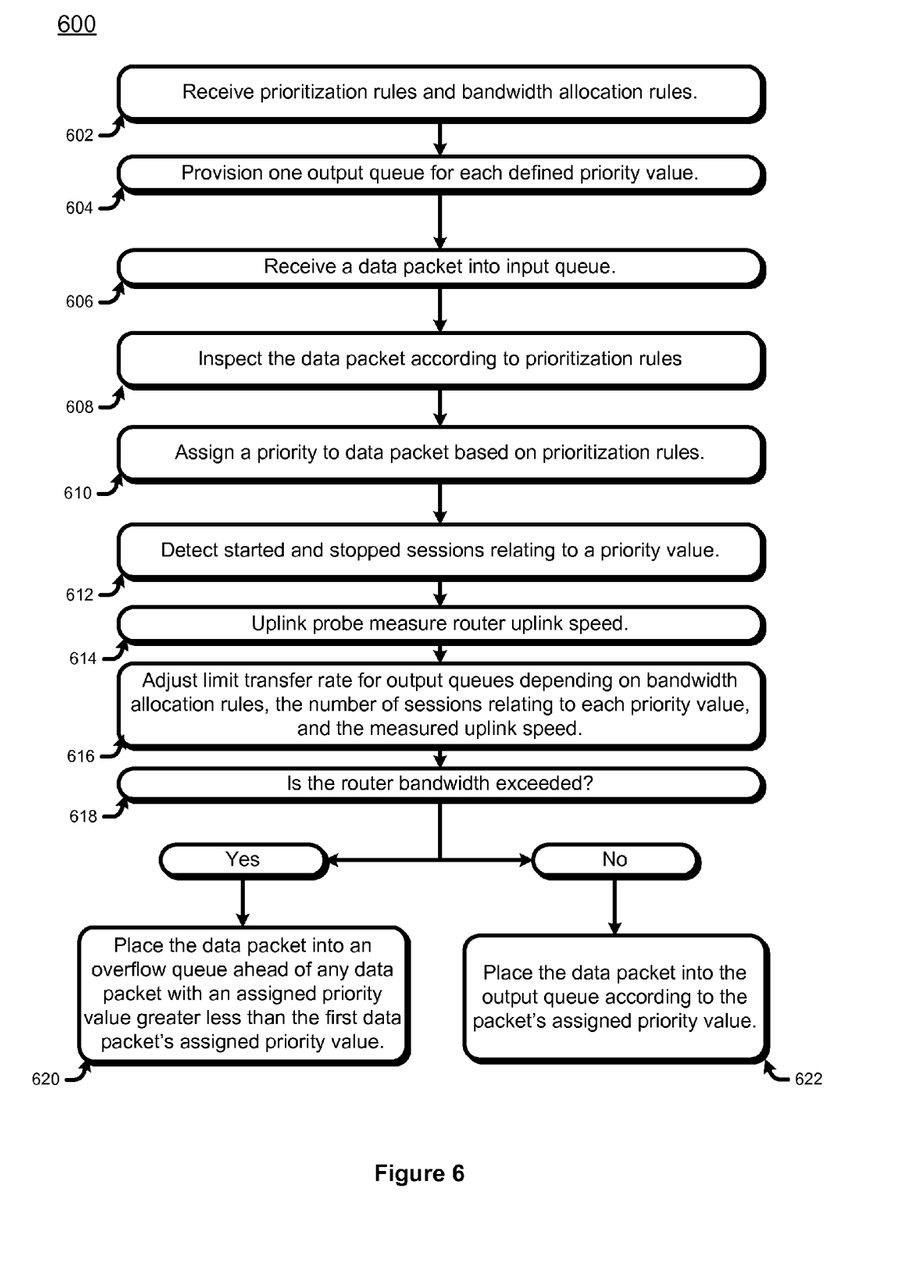
FIG. 6 is a flow chart for Home-based Router with Traffic Prioritization using multiple output queues with dynamic bandwidth allocation.

FIG. 6 is a flow chart 600 for Home-based Router with Traffic Prioritization using multiple output queues with dynamic bandwidth allocation.

At block 602, a router 102 may receive prioritization rules 512 and bandwidth allocation rules 516. The prioritization rules 512 may include a definition of a plurality of priority values, each priority value corresponding to one of the plurality of the output queue components 504.

At block 604, one output queue within the output queue components may be provisioned for each priority value defined by the prioritization rules 512.

At block 606, an input queue 502 may receive a data packet.

At block 608, a distributor 510 may inspect the data packet according to prioritization rules.

At block 610, a distributor 510 may assign a priority value to the data packet based on prioritization rules.

At block 612, the router traffic prioritization engine 226 may detect started and stopped sessions relating to a priority value. A particular session may be detected by the router traffic prioritization engine 226. For example, a voice call session may be determined to have started when the router traffic prioritization engine detects a new stream of voice IP packets at a particular frequency or with a particular packet size.

At block 614, a probing functionality 514 may measure the uplink speed of the router.

At block 616, a rate limiter 508 may adjust the transfer rate for one or more of the output queue components 504. The adjusting the transfer rate may depend at least at least on the bandwidth allocation rules 516, may additionally depend on the number of detected sessions relating to each priority value, and may additionally depend on the measured uplink speed. For example, if the router traffic prioritization engine 226 detects a new active session for a given type of data traffic relating to a given output queue, the rate limiter 508 may increase the bandwidth allocation of the given output queue and decrease the allocated bandwidth for another output queue.

Further, if the router traffic prioritization engine 226 detects zero active sessions for a given type of data traffic relating to a given output queue, the rate limiter 508 may increase the allocated bandwidth for another output queue. The rate limiter 508 may additionally take into account a maximum uplink value. The maximum uplink value may a previously measured value measured via the probing functionality 514 or may be a pre-configured value stored within the memory. In some embodiments, the probing functionality 514 and the rate limiter 508 may not be active concurrently.

At block 618, the router traffic prioritization engine 226 determines whether transferring the packet into the output queue components 504 will cause the router bandwidth to be exceeded.

If it is determined that transferring the packet into the output queue components 504 will cause the router bandwidth to be exceeded, as depicted by block 620, the distributor may place the data packet into an overflow queue ahead of any data packet with an assigned priority less than the first data packet's assigned priority value.

If it is determined that transferring the packet into the output queue components 504 will not cause the router bandwidth to be exceeded, as depicted by block 622, the distributor may place the data packet into the output queue according to the packet's.

The techniques may allow prioritization of a particular type of data traffic over another.

In various embodiments, voice data traffic may be configured to be prioritized over non-voice data traffic. For example, the prioritization rules 512 may be configured to assign a higher priority value to a data packet determined via inspection within the distributor 510 to have a voice data type than to another type of data packet.

Further, the bandwidth allocation rules may be configured to provision an output queue within the output queue components 504 for transferring the priority value of a voice data packet. The router traffic prioritization engine 226 may allow the rate limiter 508 to favor the output queue corresponding to voice data packets. Additionally, if the router traffic prioritization engine 226 detects more than one active session of that type, the rate limiter 508 may decrease the allocated bandwidth for another output queue.

In various embodiments, data traffic with a particular cellular network as its source or destination may be configured to be prioritized over other traffic. For example, the prioritization rules 512 may be configured to assign a higher priority value to a data packet determined via inspection within the distributor 510 to have a source or a destination corresponding to a particular cellular network than to another type of data packet.

Further, the bandwidth allocation rules may be configured to provision an output queue within the output queue components 504 for transferring the priority value of a data packet relating to the cellular network. The router traffic prioritization engine 226 may allow the rate limiter 508 to favor the output queue corresponding to data packets relating to the cellular network.

In various embodiments, emergency voice data traffic may be configured to be prioritized over all other traffic. For example, the prioritization rules 512 may be configured to assign a higher priority value to a data packet determined via inspection within the distributor 510 to relate to an emergency voice call than to another type of data packet.

Further, the bandwidth allocation rules may be configured to provision an output queue within the output queue components 504 for transferring the priority value of a data packet relating to an emergency voice call. The router traffic prioritization engine 226 may allow the rate limiter 508 to favor the output queue corresponding to data packets relating to emergency voice call.

In various embodiments, and data traffic related to a device connected to the router 102 via a private Wi-Fi network may be configured to be prioritized over data traffic related to a device connected to the router 102 via a guest Wi-Fi network. For example, the prioritization rules 512 may be configured to assign a higher priority value to data packets detected to relate to a private Wi-Fi network SSID than to data packets detected to relate to a guest Wi-Fi network SSID.

Further, the bandwidth allocation rules 516 may be configured to provision an output queue within the output queue components 504 for transferring the priority value of a data packet relating to a private Wi-Fi network SSID. The router traffic prioritization engine 226 may allow the rate limiter 508 to favor the output queue corresponding to data packets relating to a private Wi-Fi network SSID.

The techniques may provide a way to prioritize a particular type of data traffic over another without completely blocking another type of data traffic. As a result, quality of service may be maintained simultaneously for many types of services on many devices connected to the router 102.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for prioritizing router traffic comprising:
   a processor;
   a memory communicatively coupled to the processor;
   an unlicensed radio that supports an unlicensed data communications channel;
   an alternative communications interface that supports an alternative communications channel;
   a plurality of queue components that include a plurality of output queues and an overflow queue, wherein individual output queues of the plurality of output queues have corresponding bandwidth allocations, and
   wherein the overflow queue is configured to buffer one or more data packets from the plurality of output queues in response to a current throughput of the individual output queues exceeding the corresponding bandwidth allocations; and
   a software prioritization engine that is resident in the memory that is communicatively coupled to the unlicensed radio via an unlicensed radio driver in the memory and communicatively coupled to the alternative communications interface via an alternative communications interface driver resident in the memory, the software prioritization engine configured to:
   assign a priority value to a data packet, based on at least one prioritization rule,
   determine an order of transmission of the data packet relative to additional data packets via an output queue of the plurality of output queues, based at least in part on the priority value, and
   distribute the data packet into the overflow queue in an order ahead of any data packet with an assigned priority value less than the priority value of the data packet, based at least in part on the output queue exceeding the corresponding bandwidth allocations.

2. The system of claim 1, wherein the unlicensed radio additionally supports an additional unlicensed data communications channel and the at least one prioritization rule is based at least on whether the data packet is related to the unlicensed data communications channel or to the additional unlicensed data communications channel.

3. The system of claim 1, further comprising a router settings application resident in the memory configured to allow a user to make a change to the at least one prioritization rule or to at least one bandwidth allocation rule.

4. The system of claim 1, wherein the unlicensed data communications channel is a first unlicensed data communications channel, wherein the first unlicensed data communications channel corresponds to a private Wi-Fi channel, and further comprising:
   a second unlicensed radio that corresponds to a guest Wi-Fi channel, the second unlicensed radio supporting an additional unlicensed data communications channel, wherein the second unlicensed radio is communicatively coupled to the software prioritization engine via an additional unlicensed radio driver resident in the memory, wherein the software prioritization engine assigns a first priority value to the data packet that is associated with the private Wi-Fi channel and assigns a second priority value to an additional data packet that is associated with the guest Wi-Fi channel, the first priority value being higher than the second priority value.

5. The system of claim 4, wherein the data packet is for a specific voice data type, a particular cellular network, an emergency call, or a private Wi-Fi network, and wherein the additional data packet is for a different voice data type, a different cellular network, a non-emergency call, or a guest Wi-Fi network.

6. The system of claim 4, further comprising:
a probing functionality that is resident in the software prioritization engine, wherein the probing functionality measures a maximum uplink speed of a router associated with the router traffic;
a rate limiter that is resident in the software prioritization engine; and
at least one bandwidth allocation rule that is resident in the memory,
wherein the rate limiter dynamically adjusts the corresponding bandwidth allocations of the output queue depending at least upon the maximum uplink speed and the at least one bandwidth allocation rule.

7. The system of claim 4, further comprising a router settings application resident in the memory that receives a change to the at least one prioritization rule or to at least one bandwidth allocation rule.

8. The system of claim 4, further comprising a LTE communications interface that supports a LTE communications channel, and that is communicatively coupled to the software prioritization engine via a LTE communications driver resident in the memory.

9. The system of claim 4, wherein the alternative communications channel is provided by an internet service provider.

10. The system of claim 1, wherein the individual output queues of the plurality of output queues are further provisioned with a corresponding priority value.

11. The system of claim 1, wherein the software prioritization engine is further configured to:
determine a maximum uplink speed of a router associated with the router traffic, and
wherein, to distribute the data packet into the overflow queue is further based at least in part on that the maximum uplink speed having been exceeded.

12. The system of claim 1, wherein the software prioritization engine is further configured to assign the priority value to the data packet according to the at least one prioritization rule based at least in part on at least one of a data type, a packet size, a port number, a service set identifier (SSID), a source, or a destination.

13. A method for prioritizing router traffic comprising:
receiving, at a router, a data packet via a communications channel;
inspecting the data packet according to a prioritization rule to assign a priority value to the data packet;
transferring the data packet into an output queue, the output queue having a predetermined bandwidth allocation;
measuring a current throughput of the output queue;
determining that the current throughput of the output queue exceeds the predetermined bandwidth allocation of the output queue; and
distributing the data packet to an overflow queue in an order ahead of other data packets in the overflow queue, based at least in part on the priority value of the data packet being greater than other priority values associated with other data packets in the overflow queue and the current throughput of the output queue having exceeded the predetermined bandwidth allocation.

14. The method of claim 13, wherein the prioritization rule is configured to assign a highest priority value to data packets that relate to emergency voice calls.

15. The method of claim 13, wherein the priority value of the data packet is a first priority value, the data packet is a first data packet, and wherein the prioritization rule is configured to assign to the first data packet the first priority value that is higher than a second priority value of a second data packet based on any one of the following:
the first data packet is related to a preferred carrier and the second data packet is not;
the first data packet is related to a voice call and the second data packet is related to media; and
the first data packet is related to video call audio and the second data packet is not.

16. A method for prioritizing router traffic comprising:
receiving, at a router, a data packet;
assigning a first priority value to the data packet according to a prioritization rule;
measuring a maximum uplink speed;
determining a second priority value associated with an output queue;
transfer the data packet into the output queue, the output queue having a predetermined bandwidth allocation;
determining that a current throughput of the output queue exceeds the predetermined bandwidth allocation;
adjusting the predetermined bandwidth allocation of the output queue, based at least in part on a bandwidth allocation rule and the second priority value;
determining an order of transmission of the data packet relative to additional data packets via an output queue, based at least in part on the first priority value;
distributing the data packet into the output queue, based at least in part on the order of transmission; and
in response to determining that the maximum uplink speed is exceeded, placing the data packet into an overflow queue in an order ahead of all other data packets having priority values less than the first priority value of the data packet.

17. The method of claim 16, further comprising:
detecting a quantity of active sessions for a service related to the output queue or related to another output queue, wherein the predetermined bandwidth allocation is adjusted according to the quantity of active sessions.

18. The method of claim 16, wherein the assigning the first priority value to the data packet according to the prioritization rule is based at least in part on at least one data packet characteristic that includes: a data type; a packet size; a port number; a service set identifier (SSID); a source; or a destination.

19. The method of claim 16, wherein the prioritization rule is configured to assign a highest priority value to data packets that relate to emergency voice calls.

20. The method of claim 16, wherein the prioritization rule is configured to assign to a first data packet the first priority value that is higher than an additional priority value of a second data packet based on any one of the following:

the first data packet is related to a preferred carrier and the second data packet is not;

the first data packet is related to a voice call and the second data packet is related to media; and the first data packet is related to video call audio and the second data packet is not.

* * * * *